(12) United States Patent
Augustine et al.

(10) Patent No.: US 7,958,193 B2
(45) Date of Patent: Jun. 7, 2011

(54) SOCIAL NETWORK NOTIFICATIONS FOR EXTERNAL UPDATES

(75) Inventors: Matt Augustine, Seattle, WA (US);
Jason Blankman, Kirkland, WA (US);
Vanesa Polo Dominguez, Redmond, WA (US); Jay Fluegel, Falls Church, VA (US); Andrew Ginda, Seattle, WA (US);
Jacob DongJu Kim, Issaquah, WA (US); Steve Rosato, Woodinville, WA (US); Sandeepan Sanyal, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/147,581

(22) Filed: Jun. 27, 2008

(65) Prior Publication Data

US 2009/0327432 A1    Dec. 31, 2009

(51) Int. Cl.
*G06F 15/16* (2006.01)
*G06F 12/00* (2006.01)

(52) U.S. Cl. ........................................ 709/205; 709/250

(58) Field of Classification Search .......... 709/206–207, 709/218, 219, 250, 203, 205
See application file for complete search history.

(56) References Cited

U.S. PATENT DOCUMENTS

| | | | |
|---|---|---|---|
| 6,681,369 B2 | 1/2004 | Meunier et al. | |
| 2005/0165880 A1 | 7/2005 | Moody et al. | |
| 2005/0283753 A1 | 12/2005 | Ho et al. | |
| 2006/0004691 A1 | 1/2006 | Sifry | |
| 2006/0122861 A1 | 6/2006 | Scott et al. | |
| 2006/0242581 A1* | 10/2006 | Manion et al. | 715/733 |
| 2006/0253489 A1 | 11/2006 | Kahn et al. | |
| 2007/0162432 A1* | 7/2007 | Armstrong et al. | 707/3 |
| 2007/0174389 A1 | 7/2007 | Armstrong et al. | |
| 2007/0269783 A1 | 11/2007 | McCuller | |
| 2008/0065604 A1* | 3/2008 | Tiu et al. | 707/3 |
| 2008/0065701 A1* | 3/2008 | Lindstrom et al. | 707/201 |
| 2008/0084875 A1* | 4/2008 | Parkkinen et al. | 370/389 |
| 2008/0102856 A1* | 5/2008 | Fortescue et al. | 455/456.1 |
| 2008/0209011 A1* | 8/2008 | Stremel et al. | 709/219 |
| 2009/0077130 A1* | 3/2009 | Abernethy et al. | 707/104.1 |
| 2009/0100103 A1* | 4/2009 | Yoshioka | 707/104.1 |
| 2009/0150786 A1* | 6/2009 | Brown | 715/733 |
| 2009/0158176 A1* | 6/2009 | Kalaboukis et al. | 715/758 |
| 2009/0171691 A1* | 7/2009 | Lubarski et al. | 705/1 |
| 2009/0319288 A1* | 12/2009 | Slaney et al. | 705/1 |
| 2009/0319577 A1* | 12/2009 | Obasanjo et al. | 707/200 |
| 2009/0327437 A1* | 12/2009 | Estrada | 709/206 |

OTHER PUBLICATIONS

"Facebook Chat Launches, for Some", http://www.techcrunch.com/2008/04/06/facebook-chat-enters-pre-release-beta/.
Wolf Hilzensauer, "Co-Operative E-Learning for SMEs", Jul. 2005, 6 pages.
"Funny Orkut Profile Update Notification", http://khatraag.blogspot.com/2007/10/funny-orkut-profile-update-notification.html.

* cited by examiner

*Primary Examiner* — Zarni Maung

(57) ABSTRACT

Various technologies for notifying users of a social network service of updates to services external to the social network service by members of the social network. The external service may be a typical web service, such as blogging, and video and photo sharing services. In one implementation, a member of a social network may register the external service with the social network service. Thereinafter, updates that the user makes on the external service may trigger notifications to members of the user's social network.

11 Claims, 4 Drawing Sheets

SOCIAL NETWORK NOTIFICATIONS FOR EXTERNAL UPDATES

BACKGROUND

In today's web, many services are available that enable users to build and share content among online communities. Some of these services are specific to particular types of content sharing, such as blogs and video or photo sharing services. Other services may be more general and aggregate a variety of services.

Social network services typically provide the ability to build and maintain online social networks for communities of people who share interests. Social network services typically include some form of directory and means for users within a social network to connect.

Directories typically include a list of people in a user's social network. Some directories may even be subdivided into categories of people, such as former classmates, co-workers, fellow club members, etc. The means to connect may include services such as instant messaging, email, video and voice chat, blogging and the like.

Social network services have revolutionized the ways in which we can communicate and share information with people from around the world. Social network services are used by millions of people every day, and have become part of the contemporary social fabric.

SUMMARY

Described herein are implementations of various technologies for notifying users of a social network service of updates to services external to the social network service by members of the social network. The external service may be a typical web service, such as blogging, and video and photo sharing services. In one implementation, a member of a social network may register the external service with the social network service. Thereinafter, updates that the user makes on the external service may trigger notifications to members of the user's social network.

In another implementation, when a member of the user's social network logs on to the social network service, a means of notification, such as an icon, may be placed next to the user's identifier in a list viewed by the member. The icon may indicate that the user has made an update to the external service that the member has not yet viewed. The member may view summary data about the external service update by clicking on the icon.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As to terminology, any of the functions described with reference to the figures can be implemented using software, firmware, hardware (e.g., fixed logic circuitry), manual processing, or a combination of these implementations. The term "logic, "module," "component," or "functionality" as used herein generally represents software, firmware hardware, or a combination of these implementations. For instance, in the case of a software implementation, the term "logic," "module," "component," or "functionality" represents program code (or declarative content) that is configured to perform specified tasks when executed on a processing device or devices (e.g., CPU or CPUs). The program code can be stored in one or more computer readable media.

More generally, the illustrated separation of logic, modules, components and functionality into distinct units may reflect an actual physical grouping and allocation of such software, firmware, and/or hardware, or may correspond to a conceptual allocation of different tasks performed by a single software program, firmware program, and/or hardware unit. The illustrated logic, modules, components, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

The techniques described herein are also described in various flowcharts. To facilitate discussion, certain operations are described in these flowcharts as constituting distinct steps performed in a certain order. Such implementations are exemplary and non-limiting. Certain operations can be grouped together and performed in a single operation, and certain operations can be performed in an order that differs from the order employed in the examples set forth in this disclosure.

Figure 1:
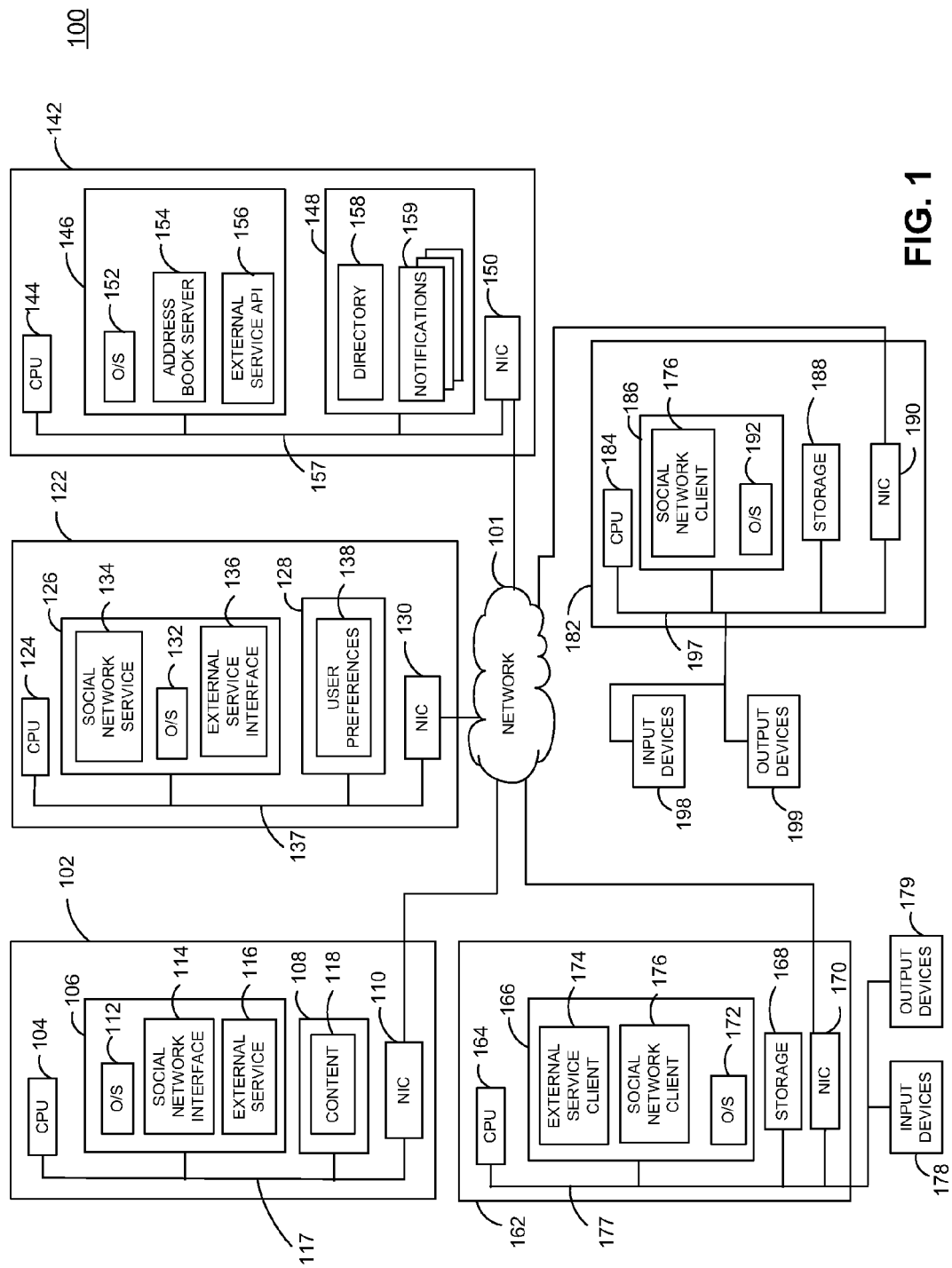
FIG. 1 illustrates a schematic diagram of a computing system in which the various technologies described herein may be incorporated and practiced.

FIG. 1 illustrates a schematic diagram of a computing system 100 in which the various technologies described herein may be incorporated and practiced. Although the computing system 100 may include conventional desktop or server computers, other computer system configurations may be used. The computing system 100 may include an external host 102, a social network host 122, an address book clearing house 142, a client computer 162, and a client computer 182.

A first user and a second user of the client computer 162 and the client computer 182, respectively, may be members of a social network service. The social network service may be provided for the users via the social network host 122. The address book clearing house 142 may identify members of the first user's and the second user's social networks. That is, the address book clearing house 142 may contain a directory of all the users of the social network service and maintain information about the users' social networks. In the implementations described herein, the first user and the second user may be members of each other's social networks.

The first user may also use a web service, such as a photo sharing service, provided via the external host 102. The descriptions that follow use the photo sharing service as an example of a web service that may be provided via the external host. However, it should be understood that the photo sharing service is merely one example of a standard web service, and is not intended to limit implementations of the various technologies described herein.

The external host 102 may include a central processing unit (CPU) 104, a system memory 106, a storage 108, a network interface 110, and a system bus 117 that couples various system components to the CPU 104. Although only one CPU 104 is illustrated in the external host 102, it should be understood that in some implementations the external host 102 may include more than one CPU 104.

The system bus 117 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 106 may include a read only memory (ROM), a random access memory (RAM), and a basic input/output system (BIOS) (none of which are shown). The BIOS may contain the basic routines that help transfer information between elements within the external host 102, such as during start-up.

The storage 108 may include a hard disk drive for reading from and writing to a hard disk, a magnetic disk drive for reading from and writing to a removable magnetic disk, and an optical disk drive for reading from and writing to a removable optical disk, such as a CD ROM or other optical media. The hard disk drive, the magnetic disk drive, and the optical disk drive may be connected to the system bus 117 by a hard disk drive interface, a magnetic disk drive interface, and an optical drive interface, respectively. The drives and their associated computer-readable media may provide nonvolatile storage of computer-readable instructions, data structures, program modules and other data for the external host 102. Neither the drives nor their respective interfaces are shown in FIG. 1.

Although the external host 102 is described herein as having a hard disk, a removable magnetic disk, and/or a removable optical disk, it should be appreciated by those skilled in the art that the external host 102 may also include other types of computer-readable media that may be accessed by a computer. For example, such computer-readable media may include computer storage media and communication media.

Computer storage media may include volatile and non-volatile, and removable and non-removable media implemented in any method or technology for storage of information, such as computer-readable instructions, data structures, program modules or other data.

Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the external host 102.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal.

By way of example, and not limitation, communication media may include wired media such as a wired network or direct-wired connection, and wireless media such as acoustic, RF, infrared and other wireless media. Combinations of any of the above may also be included within the scope of computer readable media.

Further, the external host 102 may operate in a networked environment using logical connections to one or more remote computers, such as the social network host 122, the address book clearing house 142, the client computer 162, and the client computer 182. The logical connections may include the network interface 110, connected to a network 101. The network 101 may be any network or collection of networks, such as enterprise-wide computer networks, intranets, local area networks (LAN), and wide area networks (WAN). In one implementation, the network 101 may be the Internet.

A number of program modules and data may be stored in the system memory 106 and the storage 108. Specifically, the system memory 106 may include an operating system 112. The operating system 112 may be any suitable operating system that may control the operation of a networked personal or server computer, such as Windows® Vista, Mac OS® X, Unix-variants (e.g., Linux® and BSD®), and the like.

The system memory 106 may also include a social network interface 114 and an external service application 116. The storage 108 may contain content 118. The content 118 may be data of a type related to the web service provided by the external host 102. For example, the content 118 for the photo sharing web service may be photographs.

The social network interface 114 may send a notification 159 of content 118 updates to the address book clearing house 142. In one implementation, the notification 159 may include an identifier of the user making the update, an identifier of the external service, and a timestamp of when the update takes place.

Additionally, the social network interface 114 may provide a summary of content updates in response to requests from the social network host 122. In the case of the photo sharing service, the summary may include one or two captions accompanying newly posted photos. What is included in the summary may vary according to the web service provided by the external host 102. In the case of other web services such as a weblog service, the summary may include a snippet of text from a new blog entry.

The social network interface 114 may also register the photo sharing service with the address book clearing house 142 in response to a request from the client computer 162. In one implementation, the external service client 174 may send a registration request to the social network interface 114. In response, the social network interface 114 may send a registration message to the address book clearing house 142. The registration message may identify the registering user and the external host 102.

In one implementation, the registration message may also identify roles. The roles may define access controls to the content 118. For example, the roles may include a reader role and an administrator role. The reader role may limit access to viewing the content 118. In contrast, the administrator role may allow more expansive access, such as allowing a user to make updates to the content 118.

The external service application 116 may be software that works in concert with an external service client 174 on the client computer 162 to provide the web service to the first user. For example, the external service application 116 may download the photographs from the client computer 162 in response to a request from the external service client 174. Additionally, the external service application 116 may enforce the access controls by role.

The address book clearing house 142 may be constructed similarly to the external host 102. The address book clearing house 142 may include a central processing unit (CPU) 144, a system memory 146, a storage 148, a network interface 150, and a system bus 157 that couples various system components to the CPU 144.

A number of program modules and data may be stored in the system memory 146 and the storage 148. Specifically, the system memory 146 may include an operating system 152, an address book server application 154, and an external service application programming interface (API) 156. The storage 148 may contain a directory 158 and the notifications 159.

The address book server application 154 may maintain a directory 158 of users of the social network service. Additionally, the address book server application 154 may facilitate interaction between members of the same social network. For example, the address book server application 154 may track an online status for each user of the social network service, and make the online status available to other members of the same social network. In this manner, members of the same social network may be alerted that other network members are online and initiate interactions with the online members.

The directory 158 may contain information about each user of the social network service, including contact information and the external services registered for each user. The directory 158 may also identify all the members of each user's social network. In one implementation, the user may define the role assigned to each member for a particular external service.

The external service API 156 may be an API invoked by the social network interface 114 that registers the photo sharing service for the first user. Additionally, the external service API 156 may be invoked to process the notification 159 sent by the social network interface 114. Processing the notification 159 may include determining the social network of the updating user. Processing may also include storing multiple notifications, one notification 159 for each member of the updating user's social network.

The social network host 122 may be constructed similarly to the external host 102. The social network host 122 may include a central processing unit (CPU) 124, a system memory 126, a storage 128, a network interface 130, and a system bus 137 that couples various system components to the CPU 124.

A number of program modules and data may be stored in the system memory 126 and the storage 128. Specifically, the system memory 126 may include an operating system 132, a social network service application 134, and an external service interface 136. The storage 128 may contain user preferences 138.

The social network service application 134 may be software that facilitates interaction between members of the social network service. For example, the social network service application 134 may be an instant messaging (IM) application. To access the IM application, the first user and the second user may use the social network client 176 (on the client computer 162 and the client computer 182, respectively).

In one implementation, the social network client 176 may display a member list of each user's social network. The member list may include a handle, or user id, that readily identifies each member to the user. The social network client 176 may also identify the members that are currently online.

Additionally, the social network client 176 may identify each member in the user's social network member list with recent updates to external services. In such an implementation, the social network client 176 may display a means of notification, such as an icon, next to the user id of each member that has made updates to external services. The means of notification may also be referred to herein as a gleam. The presence of the gleam may indicate that the member with the gleamed user id has made updates to external services. Additionally, the presence of the gleam may indicate that the user has not yet viewed the updates.

For example, after the first user posts new photographs on the external client, the second user may view a gleam next to the first user's user id on the second user's social network member list. In one implementation, the second user may click on the gleam to view the summary of the first user's updates.

In response to receiving the click, the social network client 176 may send a view request to the external service interface 136. In response to receiving the view request from the social network client 176, the external service interface 136 may retrieve the summary of the content 118 that has been updated from the external host 102. The external service interface 136 may then send the summary to the client computer 182. In one implementation, the social network client 176 may display the summary.

In an alternate implementation, the social network interface 114 may provide an alternate client (not shown) to the social network host 122. The alternate client may be used by the social network host 122 to display summary information about the content 118 that has been updated. The external service interface 136 may store the alternate client in the user preferences 138.

The system memory 126 may contain more than one social network service application 134. For example, in addition to the IM application, the social network host 122 may provide a blogging application. The blogging application may enable users of the social network to create content (not shown) internal to the social network host 122. In one implementation, updates to internal content may also be gleamed on the social network client 176.

The client computer 162 may be constructed similarly to the external host 102. The client computer 162 may include a central processing unit (CPU) 164, a system memory 166, a storage 168, a network interface 170, and a system bus 177 that couples various system components to the CPU 164. The system memory 166 may contain an operating system 172, the external service client 174, and the social network client 176.

Additionally, the first user may enter commands and information into the client computer 162 through input devices 178. The input devices 178 may include devices such as a keyboard and pointing device. Other input devices may include a microphone, joystick, game pad, satellite dish, scanner, or the like. These and other input devices 178 may be connected to the CPU 164 through an serial port interface coupled to the system bus 177, but may be connected by other interfaces, such as a parallel port, game port or a universal serial bus (USB).

One or more output devices 179 may also be connected to the system bus 177 via an interface, such as a video adapter. The output devices 179 may include a display monitor, or other peripheral output devices, such as speakers and printers.

The client computer 182 may be constructed similarly to the client computer 162. The client computer 182 may include a central processing unit (CPU) 184, a system memory 186, a storage 188, a network interface 190, and a system bus 197 that couples various system components to the CPU 184. The system memory 186 may contain an operating system 192 and the social network client 176.

Additionally, the client computer 182 may include input devices 198, and output devices 199 connected to the system bus 197.

Figure 2:
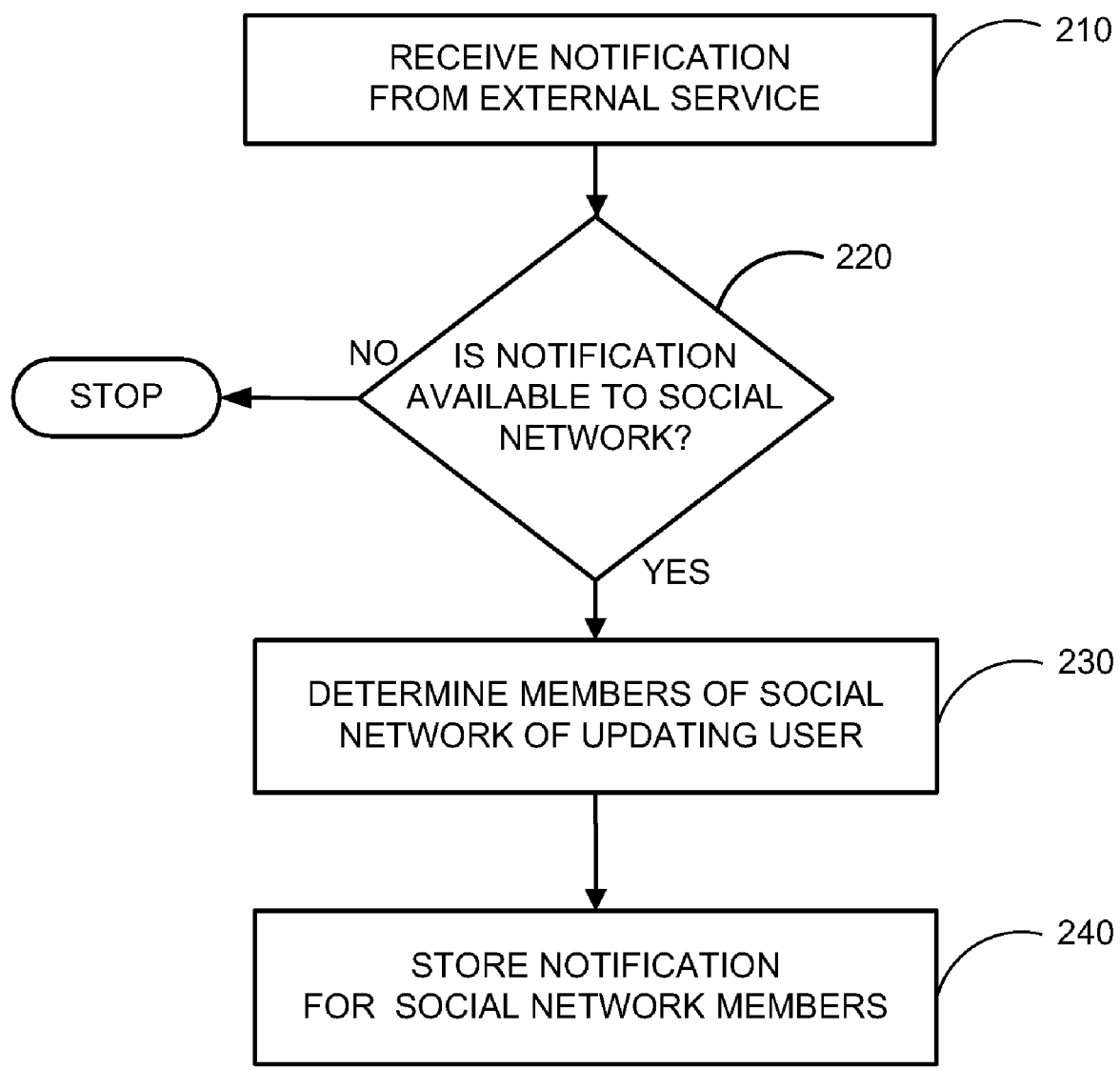
FIG. 2 illustrates a flow chart of a method for notifying a social network of updates to a member's content on an external service according to implementations described herein.

FIG. 2 illustrates a flow chart of a method 200 for notifying a social network of updates to a member's content on the external service, according to implementations described herein. In one implementation, the method 200 may be performed by the external service API 156.

As stated previously, the social network interface 114 may send a notification to the address book clearing house 142 when a user makes updates to the content 118. As such, at step 210, the external service API 156 may receive a notification from the external host 102. The notification may identify the user making the update, the external host 102, and a timestamp of when the update takes place.

In one implementation, the notification may also indicate whether the update is available for viewing to other members of the updating user's social network, i.e., whether the update is "gleamable." An update that is not gleamable may be an update that the updating user does not want members of the social network to be made aware of via a gleam, as described in FIG. 1. In other words, if the update is not gleamable, the notification may not be sent to the members of the updating user's social network. In some implementations, a gleamable flag may be defined according to role.

At step 220, if the update is available for viewing to the updating user's social network, at step 230, the external service API 156 may determine all the members of the social network for the updating user.

At step 240, the external service API 156 may store the notification 159 for each member of the updating user's social network. In one implementation, the address book clearing house 142 may encompass a multitude of server computers. As such, the directory 158 may be distributed across the multitude of server computers. In such an implementation, storing one notification 159 for each member of the updating user's social network may implicate an update that is fanned out to numerous server computers. Accordingly, the external service API 156 may schedule a batch process on each of the server computers containing the directory entries for the members of the updating user's social network. The batch processes may then store the notification 159 on each server that hosts directory entries for each member of the updating user's social network.

Figure 3:
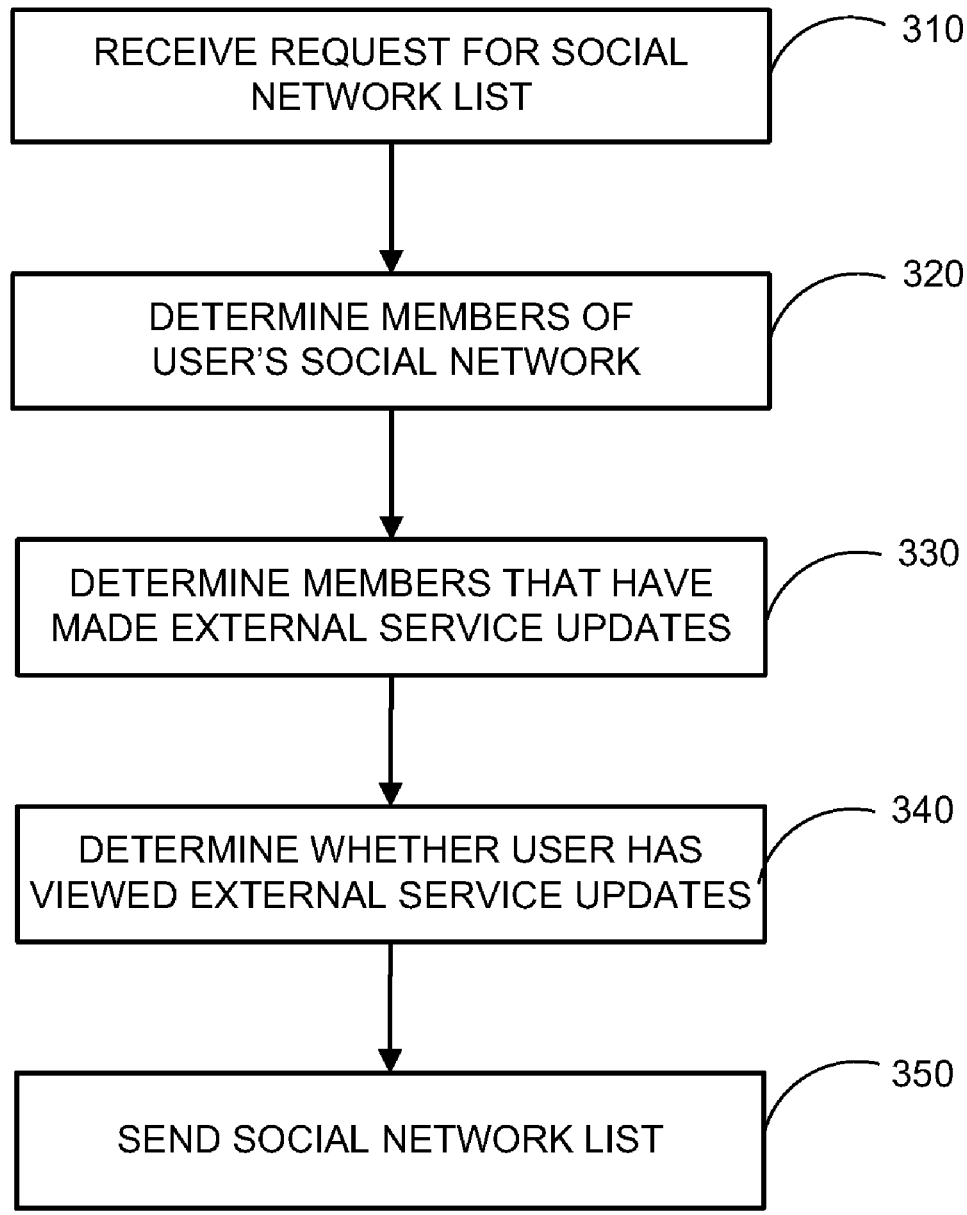
FIG. 3 illustrates a flow chart of a method for generating a list of members of a social network according to implementations described herein.

FIG. 3 illustrates a flow chart of a method 300 for generating a list of members of a social network, according to implementations described herein. In one implementation, the method 200 may be performed by the address book server application 154.

At step 310, the address book server application 154 may receive a request for a social network list, which may also be referred to as a "buddy" list, from the social network client 176. The social network client 176 may display the list to facilitate interactions with members of the user's social network.

At step 320, the address book server application 154 may determine the members of the requesting user's social network. In one implementation, the directory 158 may identify all the members of the requesting user's social network.

At step 330, the address book server application 154 may determine which members have made updates to external services. In doing so, the address book server application 154 may retrieve the notifications for each of the members in order to determine whether the members have made updates to the external services.

At step 340, the address book server application 154 may determine whether the requesting user has viewed the members' external service updates yet. In one implementation, the directory 158 may include a timestamp indicating when the requesting user last viewed external service content for each member of the requesting user's social network.

At step 350, the address book server application 154 may send the social network list to the social network client 176. For external service updates that the requesting user has not yet viewed, the social network list may also include notifications for each of the members of the social network whose external service updates the requesting user has not viewed. The social network list may also identify the external host 102 for each unviewed update.

Figure 4:
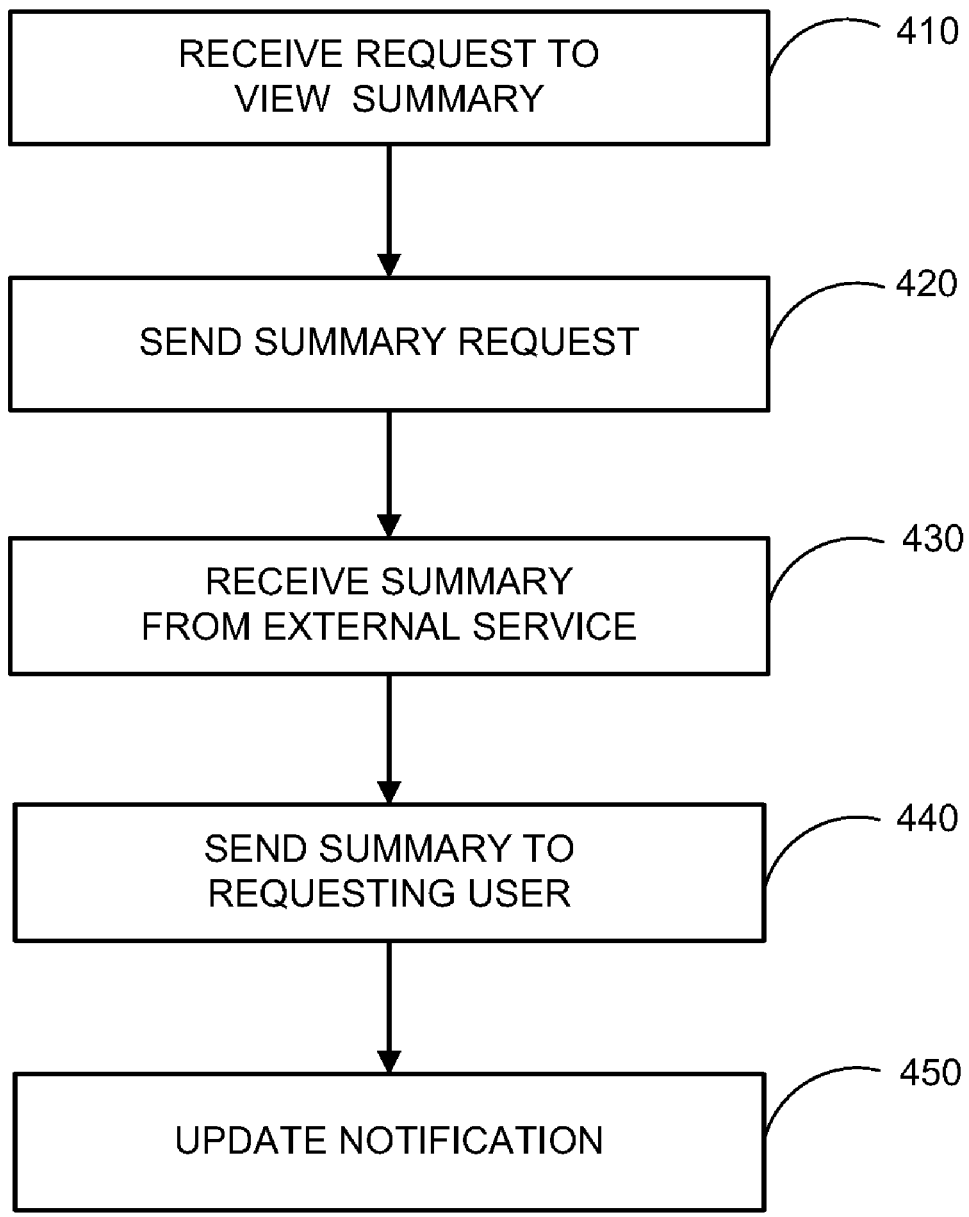
FIG. 4 illustrates a flow chart of a method for retrieving a summary of updated content from the external service in accordance with implementations described herein.

FIG. 4 illustrates a flow chart of a method 400 for determining the summary of updated content from the external service application 116, in accordance with implementations described herein. In one implementation, the method 200 may be performed by the external service interface 136.

At step 410, the external service interface 136 may receive a request to view the summary of the content 118 that has been updated. The request may be received from the social network client 176 on the client computer 182.

At step 420, the external service interface 136 may send a request to the external service application 116 to retrieve the summary of the content 118 that has been updated. In one implementation, the social network client 176 may display the two most recent updates made by the updating user. The updates may include updates made internally to the social network host 122 and updates made to the external host 102.

At step 430, the summary, or summaries (depending on the implementation) may be received. At step 440, the external service interface 136 may send the summary to the requesting user on the client computer 182. In one implementation, the summary may be displayed within the social network client 176. Alternately, the summary may be displayed within a user interface provided by the external service application 116, as described with reference to FIG. 1.

In order to prevent previously viewed content from being perceived as new, or unviewed, at step 450, the notification 159 for which the summary is viewed may be updated. In one implementation, the external service interface 136 may send an update message to the address book clearing house 142. The update message may indicate a timestamp of when the content update is viewed by the second user. The address book server application 154 may then update the notification 159 to indicate that the requesting user has viewed the associated summary.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for notifying a social network of an update made to an external service, the method comprising:
   receiving a notification from the external service indicating that a first member of the social network has made the update to the external service, the external service being external to a social network service that hosts the social network;
   determining a second member of the social network to which the first member and the second member belong;
   storing the notification for the second member;
   receiving a selection of the notification from the second member;
   requesting a summary of the update from the external service;
   receiving the summary of the update from the external service;
   providing the summary of the update to the second member for viewing in a user interface associated with the social network; and
   updating the notification for the second member to indicate that the second member has viewed the summary of the update.

2. The method of claim 1, further comprising:
   receiving a request for a list of the social network from the second member;
   determining that the first member is a member of the social network; and
   determining that the first member has made the update to the external service.

3. The method of claim 2, further comprising sending the list to the second member.

4. The method of claim 3, wherein the list indicates that the first member has made the update.

5. The method of claim 2, further comprising:
   determining whether the second member is to receive the notification; and
   sending the list with the notification to the second member if it is determined that the second member is to receive the notification.

6. The method of claim 2, wherein the notification further indicates whether the second member is to receive the notification.

7. The method of claim 2, wherein the first member is determined as having made the update based on the notification.

8. The method of claim 1, wherein the notification is stored for the second member using a batch process.

9. A computer-readable storage media device having stored thereon computer-executable instructions which, when executed by a computer, cause the computer to:
   receive a request for a list of a social network to which a first member belongs;
   determine that a second member belongs to the social network;
   determine that the second member has made an update to an external service, the external service being external to a social network service that hosts the social network;
   determine whether the first member is to receive a notification that the second member has made the update to the external service;
   send the list to the first member with the notification if it is determined that the first member is to receive the notification;
   receive a selection of the notification from the list by the first member;
   request a summary of the update from the external service;
   receive the summary of the update from the external service;
   provide the summary of the update to the first member for viewing in a user interface associated with the social network; and
   update the notification to indicate that the first member has viewed the summary of the update.

10. The computer-readable storage media device of claim 9, wherein the first member is determined to receive the notification if the first member has not viewed a summary of the update.

11. A computer system, comprising:
    a processor; and
    a memory comprising program instructions executable by the processor to:
       receive a request to view a summary of an update to an external service from a first member of a social network, the update being made by a second member of the social network, and the external service being external to a social network service that hosts the social network;
       send the request to view the summary to the external service;
       receive the summary from the external service; and
       send the summary to the first member for viewing in a user interface associated with the social network.

* * * * *